United States Patent [19]

Ohta et al.

[11] Patent Number: 4,865,414
[45] Date of Patent: Sep. 12, 1989

[54] REINFORCING MEMBERS FOR CONNECTING OPTICAL FIBERS AND PRODUCTION THEREOF

[75] Inventors: Takashi Ohta, Kasugai; Mikio Kariya, Nagoya, both of Japan

[73] Assignee: NGK Insulators, Ltd., Nagoya, Japan

[21] Appl. No.: 226,994

[22] Filed: Aug. 1, 1988

[30] Foreign Application Priority Data

Aug. 15, 1987 [JP] Japan ............................... 62-203316

[51] Int. Cl.[4] .............................................. G02B 6/38
[52] U.S. Cl. .............................. 350/96.21; 350/96.20
[58] Field of Search ................. 350/96.20, 96.21, 96.22

[56] References Cited

U.S. PATENT DOCUMENTS

| | | | |
|---|---|---|---|
| 4,123,137 | 10/1978 | Marcatili | 350/96.22 X |
| 4,509,820 | 4/1985 | Murata et al. | 350/96.21 |
| 4,729,619 | 3/1988 | Blomgren | 350/96.20 X |
| 4,778,242 | 10/1988 | Ota et al. | 350/96.20 X |
| 4,787,699 | 11/1988 | Moulin | 350/96.21 |

Primary Examiner—John D. Lee
Assistant Examiner—Phan T. Heartney
Attorney, Agent, or Firm—Arnold, White & Durkee

[57] ABSTRACT

An optical fiber-connecting reinforcing member including a resin sheet having excellent heat resistance and peelability, and at least one laminate arranged on a surface of the resin sheet. The laminate consists of a reinforcing base plate made of a ceramic and a hot melt film. The hot melt film is bonded to the resin sheet. A process for producing optical fiber-connecting reinforcing member is also disclosed. A resin sheet having excellent heat resistance and peelability is first placed on a lower holding plate with a guide, and setting a perforated plate onto the upper surface of the resin sheet. The perforated plate has longitudinal through holes bored therethrough at a specific interval. Hot melt films and reinforcing base plates are each preliminarily cut to a given size, and inserted into the longitudinal holes. An upper holding plate is placed on the perforated plate, and then hot pressing is effected.

7 Claims, 5 Drawing Sheets

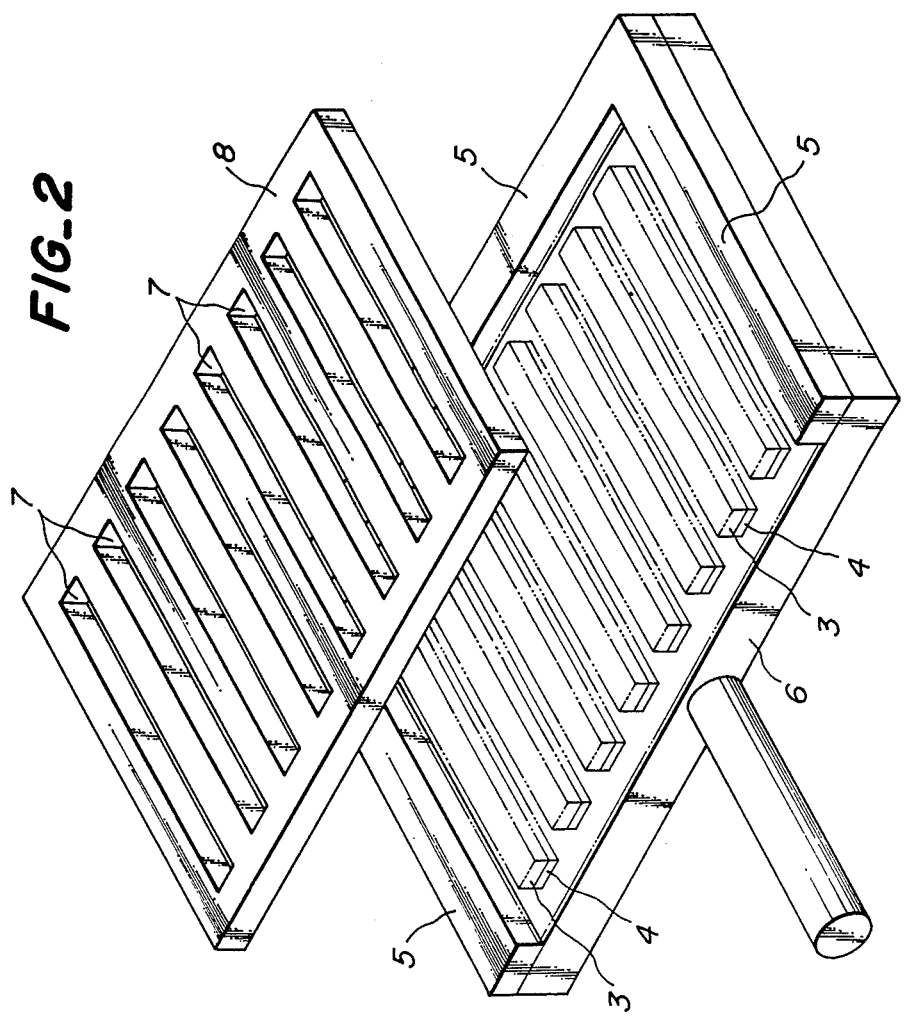

FIG_3
FIG_4
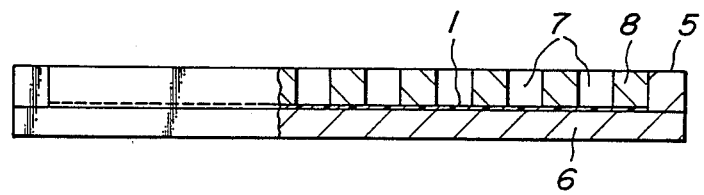
FIG_5
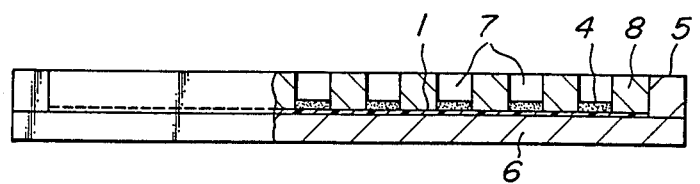

FIG_6
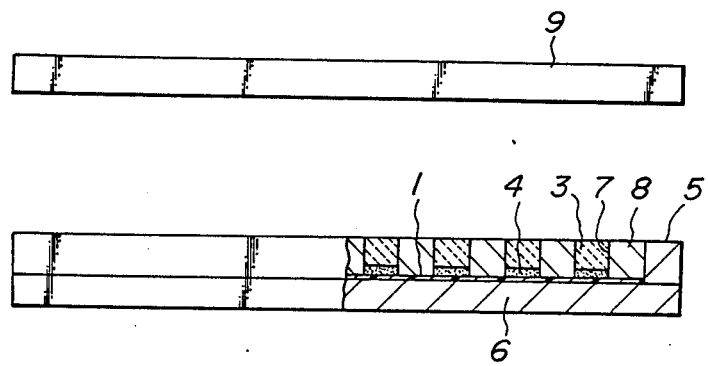
FIG_7
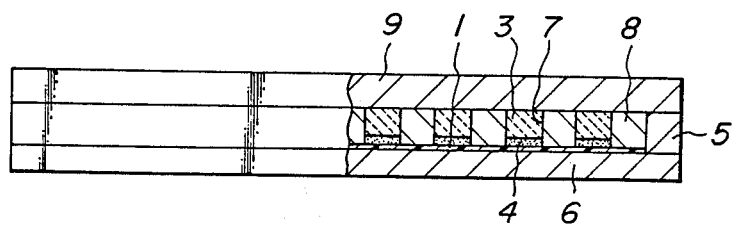

FIG_8
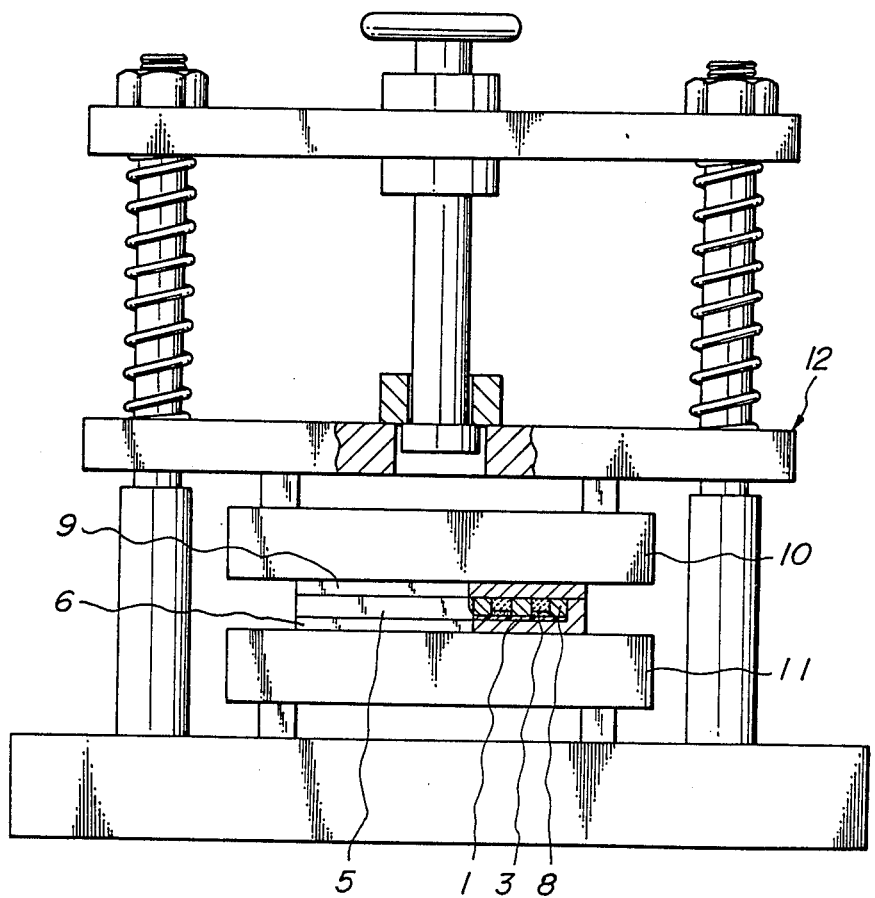

REINFORCING MEMBERS FOR CONNECTING OPTICAL FIBERS AND PRODUCTION THEREOF

BACKGROUND OF THE INVENTION (1) Field of the Invention

The present invention relates to optical fiber-connecting reinforcing members to be used for connecting tip ends of optical fibers, and also to a process for producing such reinforcing members.

(2) Related Art Statement

Optical fibers used for the purpose of optical communications and the like, are extremely thin quartz glass fibers having small diameters of around 100 μm. Thus, when tip ends of these optical fibers are to be connected together, a connecting portion needs to be reinforced by fixing the connecting portion to a reinforcing member which is formed by providing a hot melt layer on one side surface of a reinforcing ceramic base plate having the same coefficient of thermal expansion as that of the optical fibers. The above reinforcing member has conventionally been produced by hot pressing the reinforcing base plate onto a surface of a hot melt film and cutting the hot melt film in the same size as that of the reinforcing base plate with a cutter. Thus, there are problems to that the hot melt film attaches during the hot pressing to a lower holding plate for hot pressing and is not easily removed. Further, the hot melt film must be cut in a number of times, thus raising production costs. Furthermore, since such a conventional reinforcing member exposes an optical fiber-bonding surface of the hot melt film outside, dirts or dusts are likely to attach to the bonding surface during wiring.

SUMMARY OF THE INVENTION

The present invention has been accomplished to solve the problems of the prior art and to provide optical fiber-connecting reinforcing members which are free from contamination of a bonding surface for optical fibers and which can easily be handled at wiring sites, as well as a process for producing such optical fiber-connecting reinforcing members at a low cost and high efficiency.

According to a first aspect of the present invention, there is a provision of optical fiber-connecting reinforcing members characterized in that laminates each consisting of a reinforcing base plate made of a ceramics and a hot melt film are arranged on a surface of a resin sheet having excellent heat resistance and peelability in a plurality of rows, while the hot melt films are bonded to the resin sheet.

According to a second aspect of the present invention, there is a provision of a process for producing optical fiber-connecting reinforcing members, which comprises the steps of placing a resin sheet having excellent heat resistance and peelability on a lower holding plate with a guide, setting, on the upper surface of the resin sheet, a perforated plate having longitudinal through holes bored therein at a specific interval, successively inserting hot melt films and ceramic reinforcing base plates, each having been cut preliminarily to a given size, into the longitudinal holes, and placing an upper holding plate on the upper surface of the perforated plate, followed by hot pressing.

These and other objects, features and advantages of the invention will be appreciated upon reading of the following description of the invention when taken in conjunction with the attached drawings with the understanding that some modifications, variations and changes of the same could be made by the skilled person in the art to which the invention pertains without departing from the spirit of the invention or the scope of the claims appended hereto.

BRIEF DESCRIPTION OF THE ATTACHED DRAWINGS

For a better understanding of the invention, reference is made to the attached drawings, wherein:

FIG. 2 is a perspective view of a jig to be used for producing the first embodiment;

FIGS. 3 through 7 are sectional views illustrating production steps according to the present invention; and FIG. 8 is a partially cutaway front view of a hot press machine.

DETAILED DESCRIPTION OF THE INVENTION

Figure 1:
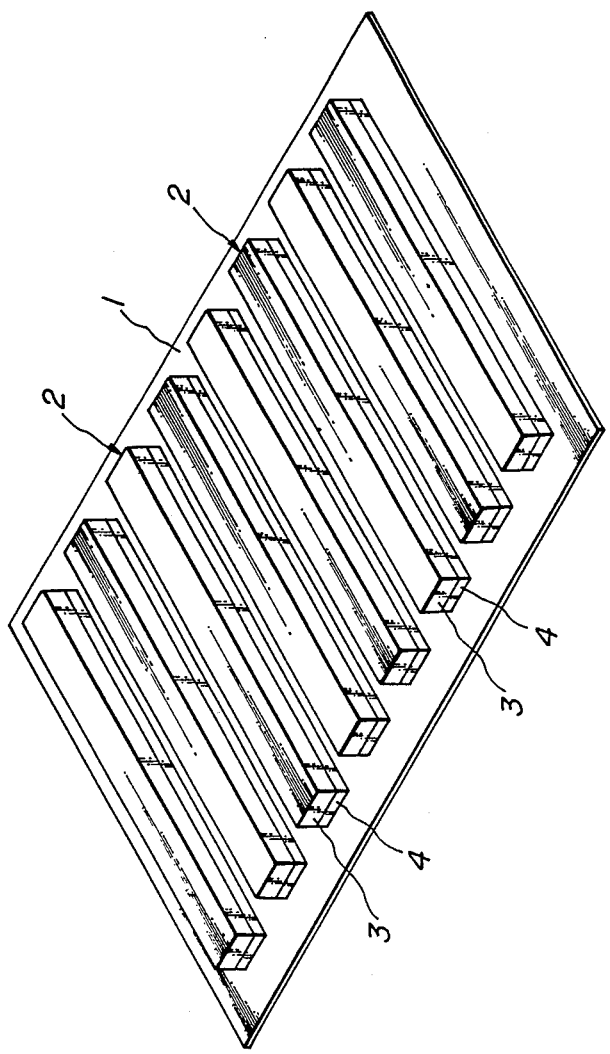
FIG. 1 is a perspective view of a first embodiment according to the present invention.

The present invention will now be explained in more detail with reference to the embodiments shown in the drawings.

FIG. 1 illustrates a first embodiment of the present invention. Reference numerals 1 and 2 are a resin sheet having excellent heat resistance and peelability, such as a polyester film, and a plurality of laminates arranged on a surface of the resin sheet 1 at a specific interval, respectively. Each of the laminates 2 consists of a reinforcing base plate 3 made of a ceramic material having almost the same coefficient of thermal expansion as that of quartz glass (about $4 \times 10^{-7}/°C.$), such as crystallized glass, and a hot melt film 4 made of, for example, ethylenevinyl acetate or the like. The reinforcing base plate 3 and the hot melt film 4 are about 1 mm thick and about 0.5 mm thick, respectively. The ceramic material may be a ceramic substrate obtained by adding 0 to 3% by weight (hereinafter referred to briefly as "%") of $TiO_2$, 0.1 to 5% of $ZrO_2$, and 0 to 5% of $P_2O_5$ as a nuclei-forming agent to a base glass consisting essentially of 1.7 to 6% of $Li_2O$, 12 to 35% of $Al_2O_3$, and 55 to 75% of $SiO_2$, melting and shaping the mixture, and thermally treating the shaped plate to precipitate β-eucryptite crystals having the crystal grain diameter of not more than 0.1 μm. As shown in the drawings, the laminate is fixed onto the surface of the resin sheet 1 by bonding the hot melt film 4 onto the surface of the resin sheet 1.

The thus constituted optical fiber-connecting reinforcing member according to the first aspect of the present invention is carried to a wiring site in the state shown in FIG. 1. When optical fibers are to be connected together, the laminate 2 is peeled off from the resin sheet 1. Then, the hot melt film 4 is butted to optical fibers, and heating is effected to reinforce the connecting portion of the optical fibers. As mentioned above, since the optical fiber-connecting reinforcing member according to the present invention is used by peeling the laminate from the resin sheet 1 immediately before use, a surface of the hot melt film can be prevented from being contaminated with dusts unlike the prior art, so that the connecting portion of the optical fibers can assuredly be reinforced. Furthermore, since the optical fiber-connecting reinforcing member according to the present invention can be rolled, it is convenient in storage and transportation.

In addition, an optical fiber-connecting reinforcing member in which a single base plate is bonded to a resin sheet may be used.

Next, the process for producing the abovementioned optical fiber-connecting reinforcing member will be explained.

As shown in FIG. 3, a resin sheet 1 is placed on the upper surface of a lower holding plate 6 on which guide members 5 project from three sides of the upper surface as shown in FIG. 2. Then, as shown in FIG. 4, a perforated plate 8 having longitudinal through holes 7 bored at a given interval is set on the upper surface of the resin sheet 1. The outer dimension of the perforated plate 8 is met with the inner dimension defined by the guide members 5, and the thickness of the former is almost equal to that of the latter. Each of the longitudinal holes 7 has the same size as that of the laminate 2, and slight escapes for the hot melt resin (not shown) are preferably formed at opposite ends of the through hole. Next, as shown in FIG. 5, hot melt films 4 preliminarily cut in a given size are inserted into the longitudinal holes 7 one by one. As shown in FIG. 6, ceramic reinforcing base plates 3 cut in the same size as that of the hot melt films are then inserted into the longitudinal holes 7 onto the hot melt films. As shown in FIG. 7, a planar upper holding plate 9 is then placed on the upper surface of the perforated plate 8. The whole assembly is set in a hot press machine 12 provided with an upper heater 10 and a lower heater 11 as shown in FIG. 8, and then preliminarily heated for 30 seconds, and finally heated at a temperature of 120° C. for 2 minutes and 30 seconds. Thereby, the hot melt films 4 are fused onto the reinforcing base plate 3 to form a laminate 2, and also simultaneously lightly bonded to the resin sheet 1 having excellent peelability and heat resistance. Thus, the optical-connecting fiber reinforcing member according to the first aspect of the present invention as shown in FIG. 1 is obtained.

According to the producing process of the second aspect of the present invention, since the upper surface of the lower holding plate 6 is covered with the resin sheet 1 having excellent peelability, the product can easily be peeled from the lower holding plate after the hot pressing. Moreover, since the preliminarily cut hot melt film 4 is inserted into the longitudinal hole 7 of the perforated plate 8 and fused onto the reinforcing base plate 3, there is no need to cut the hot melt film to meet the size of the reinforcing base plate 3 after the hot melt film is bonded to the reinforcing base plate 3. Thus, the number of production steps is advantageously reduced. However, as a matter of course, the reinforcing member in which the resin sheet is cut to meet the size of the reinforcing base plate 3 may separately be used, if necessary.

Furthermore, according to the producing process of the present invention, since the reinforcing base plate 3 and the hot melt film 4 are preliminarily cut in a given size and fused together, bubbles are unlikely to be involved in a joining interface thereof, and reliability can be enhanced.

As is evident from the aforegoing explanation, the optical fiber-connecting reinforcing member according to the first aspect of the present invention can be prevented from being contaminated at an optical fiber-contacting surface and can easily be handled at a wiring site. Further, according to the producing process of the second aspect of the present invention, the optical fiber-connecting reinforcing members can be obtained at low cost and high efficiency. Therefore, the present invention offers optical fiber-connecting reinforcing members and a producing process therefor which solve the conventional problems, and greatly contributes to developments in the industry.

What is claimed is:

1. An optical fiber-connecting reinforcing member comprising a resin sheet having excellent heat resistance and peelability, at least one laminate arranged on a surface of said resin sheet, said laminate consisting of a reinforcing base plate made of a ceramic and a hot melt film, said hot melt film being bonded to the resin sheet.

2. The optical fiber-connecting reinforcing member according to claim 1, wherein the resin sheet is a polyester film.

3. The optical fiber-connecting reinforcing member according to claim 1, wherein the ceramic is a ceramic material having coefficient of thermal expansion substantially the same as that of quartz glass.

4. The optical fiber-connecting reinforcing member according to claim 3, wherein the thickness of the reinforcing base plate is about 1 mm.

5. The optical fiber-connecting reinforcing member according to claim 1, wherein the hot melt film is ethylenevinyl acetate.

6. The optical fiber-connecting reinforcing member according to claim 5, wherein the thickness of the hot melt film is about 0.5 mm.

7. A process for producing optical fiber-connecting reinforcing members, comprising the steps of: placing a resin sheet having excellent heat resistance and peelability on a lower holding plate with a guide; setting a perforated plate onto the upper surface of said resin sheet, said perforated plate having longitudinal through holes bored therethrough at a specific interval; successively inserting hot melt films and reinforcing base plates into the longitudinal through holes, said hot melt films and said reinforcing base plates each being cut preliminarily to a given size; placing an upper holding plate on the perforated plate; and then effecting hot pressing.

* * * * *